July 15, 1958 H. H. NAIDICH ET AL 2,843,844
PROJECTING METHOD FOR CATHODE-RAY TUBES
Filed Oct. 28, 1952
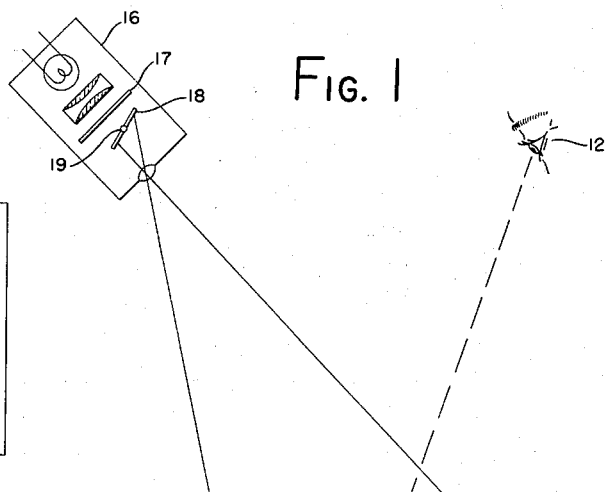
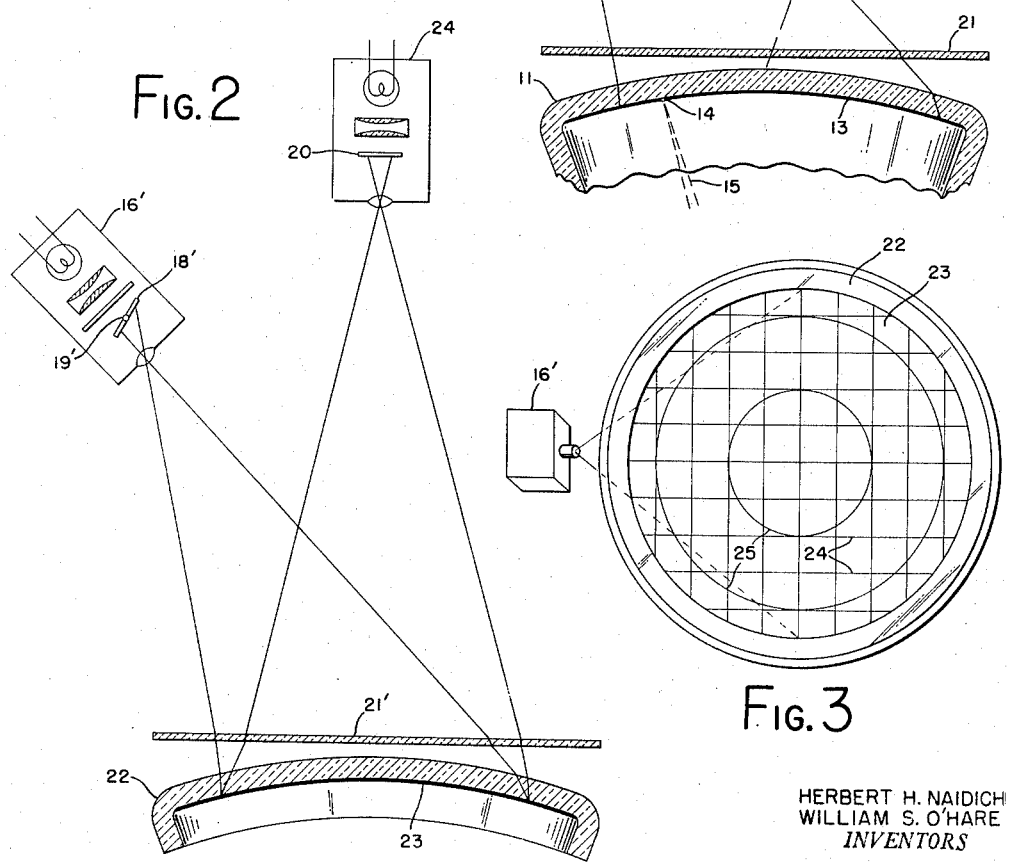
HERBERT H. NAIDICH
WILLIAM S. O'HARE
*INVENTORS*
BY
*Killman, Kerst and Pfund*
ATTORNEYS

United States Patent Office 2,843,844
Patented July 15, 1958

2,843,844

PROJECTING METHOD FOR CATHODE-RAY TUBES

Herbert H. Naidich and William S. O'Hare, Baltimore, Md., assignors to Bendix Aviation Corporation, Towson, Md., a corporation of Delaware Application October 28, 1952, Serial No. 317,226

8 Claims. (Cl. 340—368)

This invention relates generally to an improved method of projecting indicia upon the image screens of cathode-ray tubes or the like. The method is particularly directed to the combination of an externally projected image with an internal electron image at the internal screen of the cathode-ray tube in a manner which is both simple to practice and productive of exact superposition.

With the utilization of electron image tubes extending into constantly broadening fields and with the refinements being made in the well known devices of which they are a part, there has developed a corresponding need for a simple and accurate means for presenting indicia images with the electron formed image. Considerable effort has been directed toward this problem in the past with varying degrees of success. One arrangement which provides an unobstructed view of the screen area of the tube employs oblique projection of the indexing image thereon. Prior art oblique projection systems have failed to realize a simple method of superimposing any desired index image over the electron formed image such that errors caused by the effect of refraction in addition to the errors caused by the effect of parallax are eliminated.

Accordingly, it is the primary object of the present invention to provide an improved method of projecting an indexing image upon the screen of a cathode-ray tube or the like.

A further object is to provide an improved method of producing a transparency of a desired index for projection upon the screen of a tube without parallax error.

These and other objects of the present invention are achieved by projecting desired indexing indicia onto a screen of an electron discharge device. The method employed involves recording an image of the indicia on a recording means from a predetermined position through an optical path equivalent to the optical path of a projection means and reproducing the indicia on the screen of the electron discharge device by the projection means operating on the recording means from the predetermined position through the above mentioned optical path.

The invention will be better understod by reference to the following detailed description taken in conjunction with the accompanying drawings, wherein:

Fig. 1 is an elevation view, partly in section, showing projection upon the screen of a cathode-ray tube;

Fig. 2 is an elevation view, partly in section, of an arrangement for making a transparency;

Fig. 3 is an under side plan view of the arrangement of Fig. 2; and

Fig. 4 is a positive representation of a negative transparency having a rectilinear grid and circular indicia.

The arrangements herein described for practicing the method of the invention represent the present preferred embodiments for this purpose. It will be understood, however, that various other arrangements are possible which will be apparent to those skilled in the art upon perusal of the teachings herein.

Referring now to Fig. 1, a cathode-ray tube 11 is disposed for viewing or recording from a frontal viewing position 12. The tube 11 has a viewing screen 13 which has a visible pattern 14 produced thereon in any well known mannr by an electron beam 15. In order to produce reference indicia for the pattern 14 a projector 16 is provided which is positioned not to obstruct the view of the screen 13 from the position 12. The projector has all of the well known optical elements and additionally provides a colored light producing means such as a color filter 17. A slide carrier 18 is provided which is mounted at an angle to the optical projection axis of the projector 17 for in-focus oblique projection across the screen 13. The color filter 17 is positioned between the projection light source and the slide carrier 18 and any projection transparency mounted therein. Colored light thus falls upon a transparency carried by the slide carrier 18 and the transparent image thereof is focused upon the screen 13 after passing through the glass of the tube 11 and any cover glass 21 or the like which may be present.

In order that any desired index pattern may be readily obtained upon the screen 13 without parallax or refraction, the arrangement of Fig. 2 is provided for making the required transparency. The optical properties and arrangements of the elements of Fig. 2 duplicate as nearly as is possible the corresponding elements of Fig. 1. Thus a camera 16' is provided correspondingly located with respect to a cover glass 21' and an end blank 22 of a cathode-ray tube having the same size and properties as the glass of the tube 11. The camera 16' may, in fact, be the identical apparatus employed as projector 16 by merely de-energizing the light source thereof and providing suitable exposure control means for photographing the index pattern, as will be presently explained. The blank 22 has an inner surface 23 which is suitable for receiving the desired indexing marks. For example, the surface 23 may be etched or ground and may have the desired markings drawn thereon or otherwise directly applied thereto. The index pattern produced on the surface 23 is recorded as focused by the camera 16' in the plane of the slide carrier 18', preferably by photographic means.

It is also possible to make the transparency, as shown in Fig. 2, by using the actual cathode-ray tube 11 in place of the end blank 22. With this alternative arrangement a projector 24 is provided and the desired image focused on the screen 13 and photographed the same as when otherwise produced upon the surface 23 in Fig. 2. With this arrangement means should be provided to compensate for refraction and for projecting from a plane slide 20 to the curved surface 13. As the projector 24 is arranged such that the center line thereof is perpendicular to the tangent to the center of the curved surface 23, corrections for refraction and for projecting from a plane surface to a curved surface may be mathematically or graphically performed. The angular adjustment of the slide carrier 18' for recording from either surface 13 or 23 is the same as that employed for projection and is determined such that a clearly focused image obtains from all portions of the surface 13 or 23.

In Fig. 3 a bottom view of the end blank 22 shows a typical index pattern thereon consisting of great circle rectilinear grid lines 24 and concentric circles 25. Upon photographing or otherwise recording the image of the lines 24 and circles 25 in accordance with the method of the present invention a negative transparency of the form shown as a positive print thereof in Fig. 4 is readily obtained. The form of the image which is apparent in Fig. 4 results not only from the oblique angle of photography indicated in Fig. 2 but from the displacement of the light rays as they pass through the glass blank 22 and cover plate 21' as well as the other optical elements of the transmission path.

The negative transparency of Fig. 4 produced as shown in Fig. 2 when projected to the screen 13 in the arrangement of Fig. 1 will produce thereon an image of the same pattern as the index marks 24, 25 placed on the surface 23, inasmuch as the optical paths for the light rays are reciprocally identical between image and object for each system. With a distortionless image projected upon the screen 13 which is exactly superposed with the electron produced pattern 14 the composite display may be viewed from any angle without parallax. The projection may be from any convenient angle including the normal to the center of the screen 13 in which event oblique viewing would be required in the absence of special optical systems.

It will be evident that as many transparencies as are required for a particular application may be made and selectively inserted into the slide carrier 18, as desired. Ordinarily the color filter 17 will provide a color contrast to distinguish the index and electron images. With this arrangement, the screen 13 is not excited by the indexing image. Of course, other light sources, such as ultraviolet, may be employed to produce the index by excitation of the screen 13. Such displays have well known disadvantages, however.

What is claimed is:

1. The method of projecting reference indicia on the viewing screen of an electron discharge device, said screen being that on which is displayed images produced by an electron stream impinging thereon and being removed from the outer surface of said device by the thickness of the transparent envelope thereof, such that distortion of said indicia caused by refraction is eliminated thereon, comprising: the steps of producing an image of said indicia on a surface corresponding to said screen and formed on a blank having the same radius of curvature, thickness and index of refraction as said envelope; recording said image of said indicia on a recording means from a predetermined position through an optical path which includes said blank; and producing said indicia on said screen by said projection means operating on said recording means from said predetermined position through an optical path equivalent to the first mentioned optical path.

2. The method of projecting reference indicia on the viewing screen of an electron discharge device, said screen being that on which is displayed images produced by an electron stream impinging thereon and being removed from the outer surface of said device by the thickness of the transparent envelope thereof, such that distortion of said indicia caused by refraction is eliminated thereon, comprising: the steps of producing an image of said indicia on said screen; recording said image of said indicia on a recording means from a predetermined position through an optical path including said transparent envelope; and reproducing said indicia on said screen by a projection means operating on said recording means from said predetermined position through an ptical path equivalent to the first mentioned optical path.

3. The method of projecting reference indicia on the viewing screen of an electron discharge device, said screen being that on which is displayed images produced by an electron stream impinging thereon and being removed from the outer surface of said device by the thickness of the transparent envelope thereof, such that distortion of said indicia caused by refraction is eliminated thereon, comprising: the steps of producing, by an optical means, an image of said indicia on said screen; said image of said indicia produced by said optical means being corrected so that proper linearity of said indicia exists on said surface; recording said image of said indicia on a recording means from a predetermined position through an optical path including said transparent envelope; and reproducing said indicia on said screen by said projection means operating on said recording means from said predetermined position through an optical path equivalent to the first mentioned optical path.

4. The method of projecting reference indicia on the viewing screen of an electron discharge device, said screen being that on which is displayed images produced by an electron stream impinging thereon and being removed from the outer surface of said device by the thickness of the transparent envelope thereof, such that distortion of said indicia caused by refraction is eliminated thereon, comprising: the steps of producing, by an optical means, an image of said indicia on a surface of a blank, where said surface and said blank correspond optically to said screen and said envelope respectively; said image of said indicia being produced by said optical means being corrected so that proper linearity of said indicia exists on said surface; recording said image of said indicia on a recording means from a predetermined position through an optical path including said blank; and reproducing said indicia on said screen by said projection means operating on said recording means from said predetermined position through an optical path equivalent to the first mentioned optical path.

5. The method of projecting reference indicia on the viewing screen of an electron discharge device, said screen being that on which is displayed images produced by an electron stream impinging thereon and being removed from the outer surface of said device by the thickness of the transparent envelope thereof, such that distortion of said indicia caused by refraction is eliminated thereon, comprising: the steps of producing, by an optical means, an image of said indicia on a surface of a blank, where said surface and said blank correspond optically to said screen and the portion of said envelope containing said screen respectively; said optical means located on the opposite side of said blank from said surface; said image of said indicia produced by said optical means being corrected such that proper linearity of said indicia exists on said surface; recording said image of said indicia on a recording means from a predetermined position on the side of said blank corresponding to the viewing side of said electron discharge device; and reproducing said indicia on said screen by said projection means operating on said recording means from said predetermined position through an optical path equivalent to that existing between said recording means and said indicia when said indicia were recorded.

6. The method of projecting reference indicia on the viewing screen of an electron discharge device, said screen being that on which is displayed images produced by an electron stream impinging thereon and being removed from the outer surface of said device by the thickness of the transparent envelope thereof, such that distortion of said indicia caused by refraction is eliminiated thereon, comprising: the steps of producing, by an optical means, an image of said indicia on the surface of a blank, where said surface and said blank correspond optically to said screen and said envelope respectively; said optical means located on the opposite side of said blank from said surface such that the center line of said optical means coincides with the line perpendicular to a tangent to the center of said surface; said image produced by said optical means being readily corrected for refraction and curvature of said surface by virtue of symmetry of arrangement; recording said image of said indicia on a recording means from a predetermined position through an optical path including said blank; and reproducing said indicia on said screen by said projection means operating on said recording means from said predetermined position through an optical path equivalent to the first mentioned optical path.

7. The method of projecting reference indicia on the viewing screen of an electron discharge device, said screen being that on which is displayed images produced by an electron stream impinging thereon and being removed from the outer surface of said device by the thickness of the transparent envelope thereof, such that distortion of said indicia caused by refraction is eliminated thereon, comprising: the steps of inscribing a surface of a blank corresponding optically to said screen and the portion of said envelope containing said screen respectively with said image of said indicia thereon or therein; recording said image of said indicia on a recording means from a predetermined position through an optical path including said blank; and reproducing said indicia on said screen by said projection means operating on said recording means from said predetermined position through an optical path equivalent to the first mentioned optical path.

8. The method of projecting reference indicia on the viewing screen of an electron discharge device, said screen being that on which is displayed images produced by an electron stream impinging thereon and being removed from the outer surface of said device by the thickness of the transparent envelope thereof, such that distortion of said indicia caused by refraction is eliminated thereon, comprising: the steps of producing, by an optical means, an image of said indicia on said screen; said optical means located such that the center line of said optical means coincides with the line perpendicular to a tangent to the center of said screen; said image produced by said optical means being readily corrected for refraction and curvature of said screen by virtue of symmetry of arrangement; recording said image of said indicia on a recording means from a predetermined position through an optical path including said transparent envelope; and reproducing said indicia on said screen by said projection means operating on said recording means from said predetermined position through an optical path equivalent to the first mentioned optical path.

References Cited in the file of this patent

UNITED STATES PATENTS

| | | |
|---|---|---|
| 1,456,954 | Von Lucken | May 29, 1923 |
| 2,172,775 | Schmidt-Ott | Sept. 12, 1939 |
| 2,251,984 | Cleaver et al. | Aug. 12, 1941 |
| 2,316,550 | Bigalke | Apr. 13, 1943 |
| 2,483,147 | Mol | Sept. 27, 1949 |
| 2,487,817 | Lubin | Nov. 15, 1949 |